April 30, 1935.  J. F. PAGE  1,999,474
SHOCK ABSORBER ADJUSTMENT
Filed Oct. 22, 1930
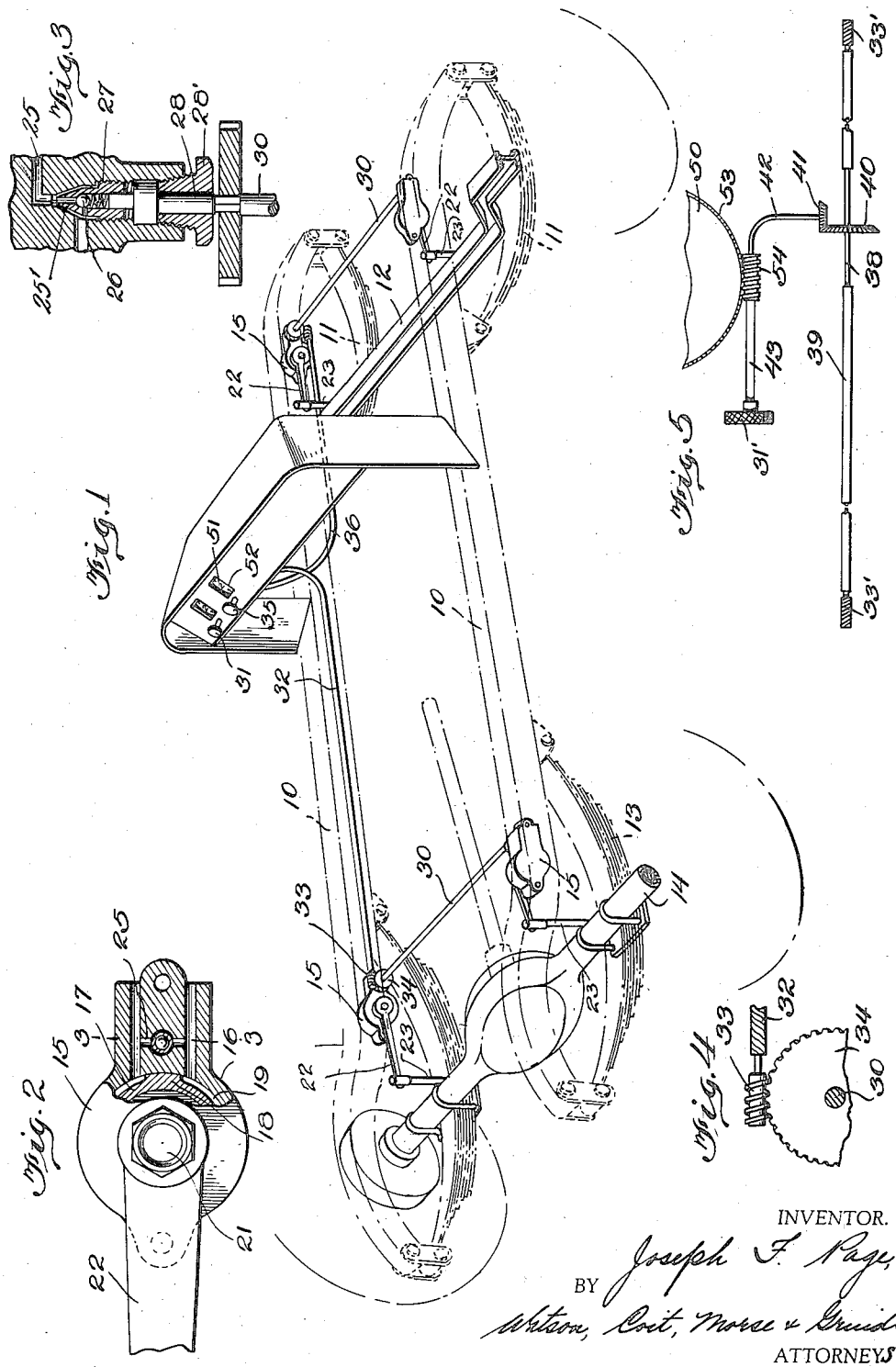
INVENTOR.
Joseph F. Page,
BY Watson, Coit, Morse & Grindle,
ATTORNEYS Patented Apr. 30, 1935

1,999,474

UNITED STATES PATENT OFFICE 1,999,474

SHOCK ABSORBER ADJUSTMENT

Joseph F. Page, Detroit, Mich., assignor to Packard Motor Car Company, Detroit, Mich., a corporation of Michigan Application October 22, 1930, Serial No. 490,491

10 Claims. (Cl. 188—87)

This invention relates to shock absorbers for automotive vehicles and more particularly to the adjustment of such shock absorbers.

It is a general object of the present invention to provide novel and improved arrangement of vehicle shock absorbers.

More particularly it is an object of the invention to provide shock absorber adjustment means for automotive vehicles operable at a distance from the absorber.

One of the features of the invention resides in the provision of means for adjusting shock absorbers from a central position on the vehicle together with indicating mechanism visible during the adjustment to show the condition of the absorbers.

Another feature of the invention resides in the arrangement of means for adjusting simultaneously and in unison two or more absorbers on a vehicle so that the absorbers on the front and/or rear axle may be all adjusted at the same time and have the same degree of resistance.

Another feature of the invention resides in the provision of means associating the adjusting device of two or more shock absorbers whereby these adjusting devices may be operated in unison to simplify the adjustment and to assure similar adjustment of the absorbers.

Other and further objects and features of the invention will be more apparent to those skilled in the art upon a consideration of the accompanying drawing and following specification wherein are disclosed two exemplary embodiments of the invention with the understanding, however, that such changes may be made therein as fall within the scope of the appended claims without departing from the spirit of the invention.

In said drawing:

Figure 1 is a perspective view of a vehicle chassis showing one form of the invention applied thereto;

Figure 2 is a view partially in section showing the by-pass valve arrangement of a representative form of hydraulic shock absorber;

Figure 3 is a section on line 3—3 of Fig. 2;

Figure 4 is a detail showing the means associating the fore and aft adjusting shaft and the transverse adjusting shaft; and Figure 5 is a schematic showing of a modification wherein all four absorbers are connected for adjustment by a single adjusting device.

In the operation of automotive vehicles and particularly pleasure cars, it is often found necessary to change the adjustment of the shock absorbers in accordance with the temperature, weather conditions, road surface, vehicle speed, vehicle load and the like, and it is of considerable advantage to be able to make these adjustments as simply and easily as possible and even from some central position, as for instance, the driver's seat, while the car is in operation. The usual arrangement of shock absorbers on automobiles is such that there is one at each end of each axle. To make an adjustment for any one of the above variable requires that each shock absorber be independently adjusted. The present invention contemplates associating the adjusting means of all of the absorbers on each axle so that they can be adjusted in unison. It further contemplates the use of operating means extending from some central position, for instance, near the driver's seat to this adjusting means for association therewith so that the shock absorbers can be readily adjusted even while the vehicle is in motion. For the best operation the absorbers on the front axle should be adjustable separately from those on the rear but the absorbers on each axle should always be adjusted to the same setting.

In order that the operator may know to what extent the adjustment has been made, the invention contemplates the provision of means visible during the adjustment and during the operation of the car to indicate the position of the adjusting means.

For the sake of simplicity, the invention has been illustrated in connection with an automotive vehicle wherein longitudinal springs connect the chassis frame and the axle and wherein each spring is controlled by a separate shock absorber. The shock absorbers shown are of the so-called hydraulic type wherein the adjustment is effected by changing the position of a by-pass valve controlling the fluid therein. Obviously any other form of absorber having adjusting means would be equally subject to the application of the present invention.

Referring now to the drawing, Figure 1 shows more or less diagrammatically a vehicle chassis having a frame provided with longitudinal side members 10, each connected by a spring 11 to the front axle 12 and by a spring 13 to a rear axle 14.

To control the action of the springs there is provided near each end of each axle and connected at a suitable place on the frame, a shock absorber 15. It will be appreciated that any form a shock absorber may be used, but in the particular embodiment of the invention illustrated, the absorber is of the type known as hydraulic in which a casing 16 containing a suitable fluid is provided with a rotatable member 17 having one or more vanes 18 thereon between which and vanes (not shown) in the casing, the fluid is confined in the spaces 19.

Each casing for purposes of illustration is shown as secured to the inner face of a longitudinal frame member 19, and arranged one for each spring. The member portion 17 is connected by means of a shaft 21 to an arm 22 connected by a link member 23 to the axle, so that as the spring is compressed or distended, the arm 22 is given a partial rotation. This causes the fluid in compartments 19 to attempt to move from the compartment which is being contracted to the one which is being expanded and in so doing the liquid passes through passages connected by the lateral passage 25. The passage 25 is always partially restricted by the tapered plug 25' cooperating with a correspondingly shaped seat. The resistance to the flow of liquid is the same for either direction of flow and produces the damping action. Abnormal shocks may cause the fluid to by-pass the plug through the spring-pressed check valve 26 for movement in but one direction but in normal operation this valve is closed.

It will be apparent that as the load in the car is varied and as road conditions change or as the temperature and hence the viscosity of the fluid changes, that adjustment of the position of the plug 25' in respect to the seat will be necessary to give the proper degree of riding comfort. For this purpose the cylindrical portion of the plug is threaded to engage internal threads in the hole 27 in the casing 16 whereby the plug may be rotated for adjustment. A stem 28 has a squared end slidably fitting in the plug for the purpose of rotating it and forms a closure for the opening holding the spring and ball valve. This stem extends through the bushing 28' and has a bearing therein, but is prevented from moving longitudinally by the integral enlargement 29. Thus when rotation of the stem causes retraction of the plug 25' the spring acting on the ball 26 is compressed to reduce the abnormal flow through the ball check valve.

Since the shock absorbers connected to each axle should be adjusted simultaneously, means are provided for connecting the adjuster stems 28 thereof for simultaneous movement. Conveniently, this may consist of a shaft 30 arranged transversely of the vehicle and joining the adjuster stems 28 so that when one absorber is adjusted, a consequent adjustment of the other is automatically effected.

In order that adjustment may be made from the driver's seat, there is provided, conveniently on the dash of the vehicle, a knob 31 manually rotatable and connected through a Bowden wire 32, or any other equivalent operating mechanism, to the worm 33 meshing with the worm wheel 34 on the shaft 30 for the rear axle shock absorbers. By this means the shaft 30 can be adjusted by a simple rotation of the knob 31 while the driver is seated in position for operating the vehicle. In Figure 1 there is shown a second knob 35 and its connecting cable 36 for adjusting the shock absorbers on the front of the vehicle, the arrangement being identical with that described in connection with the absorbers on the rear.

For the sake of simplicity, it may be desired to adjust all four of the shock absorbers simultaneously and this can conveniently be effected by connecting the worms 33', as seen in Figure 5, directly together by means of a Bowden wire 38 in a suitable and conventional sheath 39 and providing this wire with, for instance, a bevel gear 40 cooperating with a second bevel gear 41 on the Bowden wire 42 connected with the shaft 43 of the adjusting knob 31' which is positioned as described in connection with Figure 1. It will be seen that rotary movement of the knob 31' will be transmitted to the wire 38 connected to both of the worms 33' which will drive the worm wheels on the adjusting shafts 30.

In order that the operator may know to what extent he has adjusted the shock absorbers, there is provided a convenient indicator in the form of a drum 50 having suitable indicia 51 thereon visible through an aperture 52 in the instrument board of the vehicle just above the knob. This drum is provided on its periphery with worm gear teeth 53 meshing with the worm 54 on the shaft 43 of the operating knob so that as the knob is rotated a consequent movement is given to the drum and the proper indicia brought beneath the window to indicate the extent of adjustment.

With the form of invention disclosed in Figure 5, it will be appreciated that there may be a condition existing at the time of manufacture which necessitates a different adjustment of the absorbers at the front of the vehicle from those at the rear, in which case this is initially made before connecting the operating mechanism so that no matter how the operating mechanism is adjusted there will always remain this difference in adjustment between the front and rear shock absorbers.

Having thus described the invention, what is claimed as new and desired to be secured by Letters Patent is:

1. In an automobile having a chassis frame, a pair of axles and a pair of hydraulic shock absorbers operatively connected between each axle and said frame and having a fluid by-pass valve on each, the combination of means operable from a central position to adjust the valves of each pair in unison, and means visible to the operator while making the adjustment to indicate the extent thereof separately for each pair.

2. In an automobile having a chassis frame, axles and shock absorbers of the hydraulic type operatively connected between the frame and axles and each having a by-pass valve to regulate the resistance thereof, the combination of a single means operable from a central position to mechanically adjust all said valves in unison, and means visible at said position to indicate positively the adjustment of the valves.

3. In an automobile having a chassis frame, an axle attached by springs thereto and a pair of shock absorbers connected between said frame and axle and each having an adjuster thereon, the combination of a shaft connecting said adjusters for movement in unison to simultaneously adjust said absorbers, a knob in reach of the driver, and means operatively connecting said knob and shaft.

4. In an automobile having a chassis frame, an axle attached by springs thereto and a pair of shock absorbers connected between said frame and axle and each having an adjuster thereon, the combination of a shaft connecting said adjusters for movement in unison to simultaneously adjust said absorbers, a knob accessible to the operator, means operatively connecting said knob and shaft, and means operated by said knob to indicate the amount of adjustment imparted to said absorbers.

5. In an automobile having a chassis frame, a pair of axles attached by springs thereto and a pair of shock absorbers connected between said frame and each axle and each having an adjuster thereon, the combination of a shaft connecting together the adjusters of each pair for movement in unison to simultaneously adjust said absorbers, drive means connecting the said shafts for movement in unison and means to actuate said drive means from a central position on the vehicle to adjust all absorbers.

6. In an automobile having a chassis frame, a pair of axles attached by springs thereto and a pair of shock absorbers connected between said frame and each axle and each having an adjuster thereon, the combination of a shaft connecting together the adjusters of each pair for movement in unison to simultaneously adjust said absorbers, connecting means for said shafts to drive them in unison, a knob on the instrument board of the automobile, reducing gearing operated by said knob, means driven by said gearing to actuate said connecting means, and adjustment indicating means actuated by said reducing gearing.

7. In an automobile having a chassis frame, a pair of axles attached by springs thereto and a pair of shock absorbers connected between said frame and each axle, the combination of a rotatable adjuster on each absorber and each facing inwardly, a shaft connecting the adjusters of each axle, and flexible means extending from the driver's compartment to each shaft to rotate it.

8. In an automobile having a chassis frame, a pair of axles attached by springs thereto and a pair of shock absorbers connected between said frame and each axle, the combination of a rotatable adjuster on each absorber and each facing inwardly, a shaft connecting the adjusters of each axle, flexible means extending from the driver's compartment to each shaft to rotate it, and means in said compartment to indicate the degree of adjustment.

9. In an automobile having a chassis frame, wheels, means mounting the wheels on the frame for rising and falling movement in respect thereto, shock absorbers of the hydraulic type operatively connected between the wheels and the frame, each absorber having a by-pass valve to regulate the resistance thereof, the combination of a single means operable from a central position to mechanically adjust all of said valves in unison, and means associated with said control means by which the valve adjustment can be determined positively from the central position.

10. In an automobile having a chassis frame, wheels, means mounting the wheels on the frame for rising and falling movement in respect thereto, a shock absorber for each wheel and operatively connected between the wheel and the frame, each absorber having an adjuster thereon, the combination of means connecting said adjusters for movement in unison to simultaneously adjust said absorbers, a knob in reach of the driver, and means operatively connecting said knob and connecting means.

JOSEPH F. PAGE.